July 13, 1937.  W. H. FRANK  2,086,795
ELECTRICAL DISTRIBUTION SYSTEM
Filed April 30, 1934  2 Sheets-Sheet 2
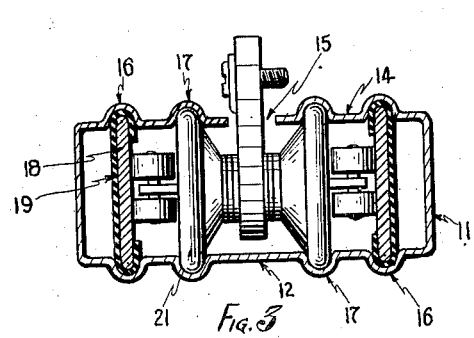
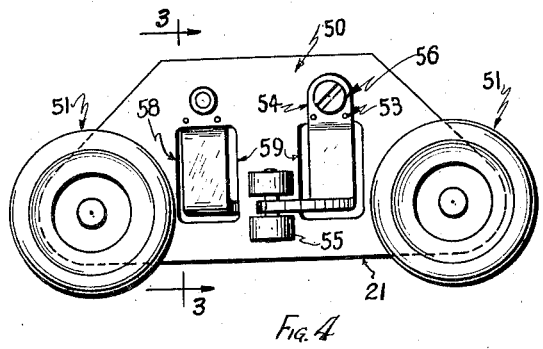
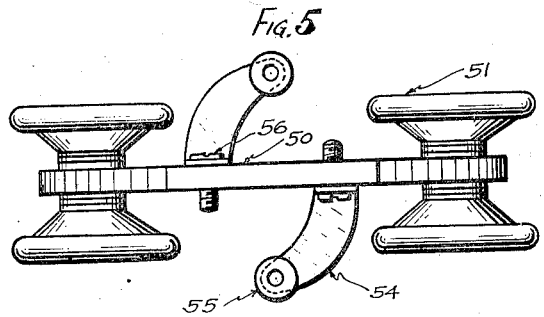

Patented July 13, 1937

2,086,795

UNITED STATES PATENT OFFICE 2,086,795

ELECTRICAL DISTRIBUTION SYSTEM

William H. Frank, Detroit, Mich., assignor to Bulldog Electric Products Company, Detroit, Mich., a corporation of West Virginia Application April 30, 1934, Serial No. 723,053

12 Claims. (Cl. 247—3)

This invention relates to electrical distribution systems and more particularly to bus duct and collector systems.

A principal object of the present invention is to provide a bus duct which shall be of light weight and small size, and which has a high degree of economy of manufacture and installation.

A further object is to provide a bus duct run which will be sturdy and rigid enough to support a plurality of collectors and appurtenances which may be attached to and depend from such collectors, the bus duct presenting no obstacles to interfere with the free operation and movement of the collectors. Further, the bus duct is so constructed that the rails therein upon which the collectors ride and are supported are separate and independent of the bus bars therein along which move or ride contact parts of the collectors, the bus bars not supporting the collectors.

A further object is to provide a bus duct having beads providing grooves for the reception of opposite edges of bus bars, the grooves thus supporting the bus bars in place. Further, similar beads may be formed to provide tracks for the reception of trolley riding wheels.

A further object is to provide a bus duct having a longitudinal access slot which is much narrower than the distance between the bus bars in the duct whereby it will be next to impossible to insert objects into the duct through the slot and accidentally create a short circuit by bridging the bus bars through the object.

A further object is to provide a bus duct construction which shall be relatively inexpensive of manufacture and installation and which accordingly will find acceptance in the industry.

Still further objects and aims of the invention will presently be understood upon reference to the appended drawings, which shows parts of an electrical distribution system of the invention, reference being had to the following detailed description, which aids in an understanding of these drawings. In these drawings, Fig. 1 is an end sectional view of a bus duct with a trolley shown therein in phantom;

Fig. 3 is a small scale sectional view of the duct and the trolley therein;

Fig. 4 is a side view of the trolley per se;

Fig. 5 is a top plan view of Fig. 4.

Figure 1:
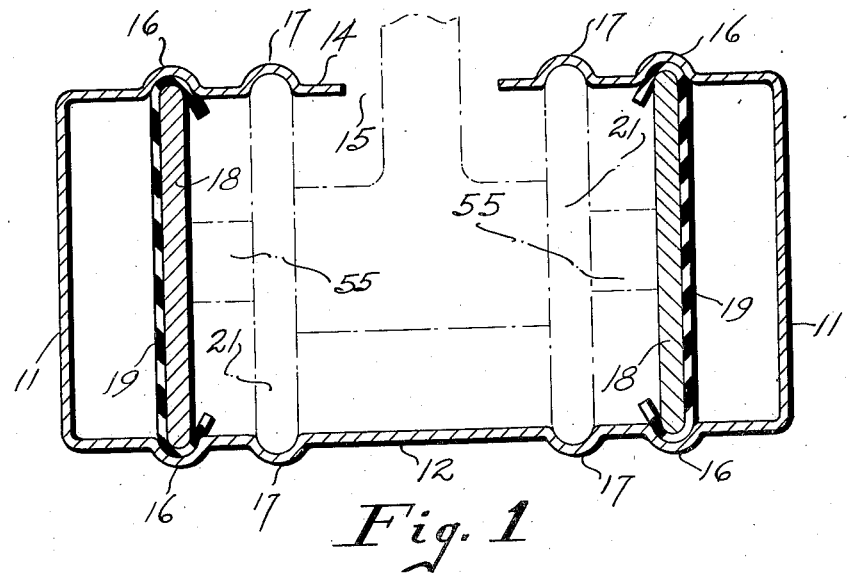
Figure 2:
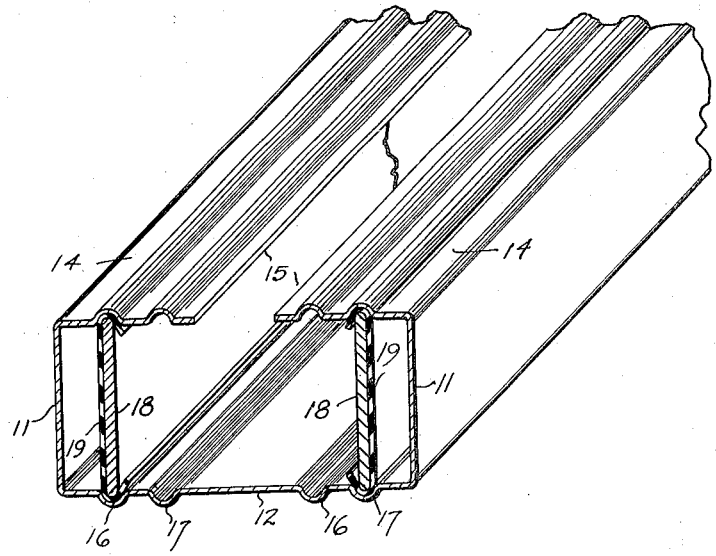
Fig. 2 is an isometric view of the duct per se on smaller scale.

It will be understood that the bus duct of the invention comprises bus duct sections, to be joined end to end to provide a bus duct run. Each section of bus duct comprises a section of duct of sheet metal having sides 11, a bottom 12, and a top 14, the latter having a narrow central slot 15. Formed in the bottom and top walls of the duct are two sets of beads 16 and 17. The set of beads 16 provides grooves for receiving bus bars 18 which are partially enclosed by insulation 19 rolled around the bus bars before the bus bars are assembled with respect to the duct, and the walls of these grooves firmly hold the bus bars 18 and the insulation in place without requiring any additional securing means. The set of beads 17 provide tracks for the wheels of a trolley 21 which will be described more particularly at a later stage of this specification.

The trolley 21 which forms part of the system here disclosed includes a relatively thick and rigid plate 50 of insulation, formed to ride in the slot 15 of the duct. On the ends of the plate are rollers 51 whose rounded edges ride in the tracks formed by the set of beads 17 and the engagement of the rounded edges of the rollers with the tracks thus provided assures smooth and easy riding for the trolleys 21, and also provides thrust bearing and guides for the trolleys. On opposite sides of the plate 50, by means of rivets 53, are secured double L-shaped plates 54 of relatively springy metal. The free ends of the plates are provided with roller collectors 55 for engaging the bus bars 18 and the anchored ends of the plates are provided with binding posts 56 by means of which external conductors may be connected to the plates 54. Each plate is offset somewhat, as indicated best, at 57 to have its major portion disposed within a slot 58 of the plate 50, and the vertical portion of each plate, within the slot, is preferably covered with a fabric insulation cover (not shown). The provision of the slots 58 and the offsets 57 assures a springiness to the plates 54 which is greater than would be the case if these features were omitted. It will be seen that the slots 58 are separated from each other by a portion 59 of the plate 50, which portion acts as a barrier between collectors 55 on opposite sides of the trolley, these collectors obviously being of opposite polarity.

It will be seen that the plates 50 are made almost as thick as the slot 15 and this feature aids in preventing the egress of sparks which might possibly be created in the duct by virtue of the contact created by rollers 55 engaging the bus bars. However, the plate 50 is so narrow as to require a very narrow slot 15, and this slot is so narrow that it does not interfere with the substantially complete closure provided by the walls of the duct.

Now having described embodiments of the invention, reference will be had to the appended claims for a determination of the scope of the invention.

I claim:

1. A trolley duct comprising a duct having a plurality of walls one of which is provided with a trolley-riding slot, beads therein providing grooves for the reception of edges of insulated bus bars, and beads therein providing tracks for the reception of trolley wheels.

2. A trolley duct comprising a duct of rectangular cross section having a bottom, sides, and a top provided with a continuous elongated trolley riding slot, beads in the bottom and top walls providing grooves for the reception of opposite edges of bus bars, and other beads in the bottom and top walls providing tracks for the reception of trolley wheels.

3. A trolley duct comprising a duct having a plurality of walls, one of which is provided with a continuous elongated longitudinal slot, the slotted wall providing a longitudinal rail for a trolley wheel in the duct, another wall being provided with a formation extending longitudinally of the duct and parallel to the rail provided by the slotted wall and forming a second rail for the trolley wheel that rides on the first mentioned rail, the two rails preventing movement of the trolley wheel in a direction perpendicular to the longitudinal axis of the duct.

4. In an electrical distribution system, a duct comprising a sheet metal channel-shaped casing having longitudinally extending spaced beads formed therein, and a longitudinally extending ribbon-like bus bar having its edges received within the beads, the bus bar being insulated from the channel.

5. A bus duct run comprising a bus run in the form of a smooth ribbon of conducting material, and a duct run in the form of a metal duct, the duct run having peripherally spaced formations in the form of beads for tightly receiving the edges of said bus run and thereby clamping it in place.

6. A bus duct run, comprising a bus run and a sheet metal duct run provided with parallel rolled beads facing each other to form facing grooves for receiving and holding opposite edges of said bus run tightly therein.

7. A bus duct run comprising a sheet metal duct run having parallel facing grooves provided by beads thereof, a bus run having its edges received and clamped in said grooves, an insulation run of C cross section in said grooves between the bus bar edges and the duct wall and concealing all but a narrow stripe on one flat side of the bus run.

8. In a sheet metal trolley duct, two longitudinally extending sheet metal duct walls, connected by a third duct wall, and a longitudinally extending bus run remote from said third duct wall whose edges are in insulated engagement with said two first mentioned duct walls whereby the two first mentioned duct walls and bus run mutually reinforce one another.

9. A trolley duct having opposed facing walls, one of which is provided with a longitudinal riding slot, both of said walls having longitudinal continuous rails providing tracks for trolley wheels, and longitudinal continuous grooves remote from and independent of said tracks for receiving edges of bus runs.

10. In a trolley duct, opposed parallel rails spaced apart a distance substantially equal to the diameter of the trolley wheel designed to ride therealong so that a single wheel rides between and along the opposed rails and is restrained from shifting towards and away from the rails by engagement with both rails.

11. In a trolley duct, opposed parallel rails on opposed parallel walls spaced apart a distance substantially equal to the diameter of the trolley wheel designed to ride therealong so that a single wheel rides between and along two opposed rails and is restrained from shifting towards and away from the rails by engagement with both rails.

12. In a sheet metal trolley duct, a longitudinally extending sheet metal duct having facing longitudinally extending grooves formed by beads deformed from the sheet metal walls and a longitudinally extending bus run whose edges are within the grooves and are in cooperating interlocked and clamped engagement with the grooves, whereby the bus run and the duct are mutually secured.

WILLIAM H. FRANK.